United States Patent
Koch (10) Patent No.: US 12,179,120 B2
(45) Date of Patent: *Dec. 31, 2024

(54) SYSTEMS AND METHODS FOR FRACTIONAL OWNERSHIP OF USER-GENERATED CONTENT WITHIN AN ONLINE GAMING PLATFORM

(71) Applicant: Mythical, Inc., Sherman Oaks, CA (US)

(72) Inventor: Rudy Koch, Sammamish, WA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/328,633

(22) Filed: Jun. 2, 2023

(65) Prior Publication Data
US 2023/0302366 A1 Sep. 28, 2023

Related U.S. Application Data

(63) Continuation of application No. 17/503,012, filed on Oct. 15, 2021, now Pat. No. 11,707,685, which is a (Continued)

(51) Int. Cl.
*A63F 13/79* (2014.01)
*A63F 13/35* (2014.01)
(Continued)

(52) U.S. Cl.
CPC .............. *A63F 13/79* (2014.09); *A63F 13/35* (2014.09); *A63F 13/63* (2014.09); *G06F 3/0482* (2013.01); *G06F 3/0484* (2013.01)

(58) Field of Classification Search
CPC .......... A63F 13/79; A63F 13/35; A63F 13/63; A63F 13/352; A63F 13/73; G07F 17/3241; G06F 3/0482; G06F 3/0484
See application file for complete search history.

(56) References Cited

U.S. PATENT DOCUMENTS

| 8,469,801 | B2 | 6/2013 | Ocko |
| 9,452,356 | B1 | 9/2016 | Tsao |

(Continued)

FOREIGN PATENT DOCUMENTS

WO  2020247002  12/2020

OTHER PUBLICATIONS

RockstarFlipper, "Ebay for Beginners, Episode #5. Top Rated Seller & Feedback"—(https://www.youtube.com/watch?v=6tk9sZ95ZW8), Mar. 19, 2017 (Year: 2017).
(Continued)

*Primary Examiner* — David L Lewis
*Assistant Examiner* — Shauna-Kay Hall
(74) *Attorney, Agent, or Firm* — Esplin & Associates, PC (57) ABSTRACT

Systems and methods for dispersing gains derived from ownership of user-generated content among users of a gaming platform are disclosed. Exemplary implementations may: execute an instance of a game and implement in-game actions in the instance of the game as requested by the users; assign ownership of a first item of user-generated content to a group of users; record the ownership of the first item of user-generated content by the group of users; determine a first quantity of gains that have been gained within the gaming platform through use of the first item of user-generated content; and disperse at least a portion of the first quantity of gains to individual ones of the group of users.

20 Claims, 5 Drawing Sheets

Related U.S. Application Data continuation of application No. 17/185,786, filed on Feb. 25, 2021, now Pat. No. 11,179,640.

(51) Int. Cl.
*A63F 13/63* (2014.01)
*G06F 3/0482* (2013.01)
*G06F 3/0484* (2022.01)

(56) References Cited

U.S. PATENT DOCUMENTS

| | | | |
|---|---|---|---|
| 9,665,239 | B1 | 5/2017 | Koh |
| 9,895,613 | B1 | 2/2018 | Holtz |
| 10,512,843 | B1 | 12/2019 | Cunningham |
| 10,518,178 | B1 | 12/2019 | Cunningham |
| 10,765,948 | B2 | 9/2020 | Eatedali |
| 10,835,828 | B1 | 11/2020 | Pather |
| 10,850,202 | B1 | 12/2020 | Koch |
| 10,861,095 | B1 | 12/2020 | Koch |
| 10,946,283 | B1 | 3/2021 | Meilich |
| 10,946,291 | B1 | 3/2021 | Harris |
| 10,984,400 | B1 | 4/2021 | Koch |
| 11,044,098 | B1 | 6/2021 | Thacker |
| 11,045,729 | B2 | 6/2021 | Yoshida |
| 11,135,516 | B1 | 10/2021 | Koch |
| 11,138,580 | B1 | 10/2021 | Koch |
| 11,141,664 | B1 | 10/2021 | Koch |
| 11,148,058 | B1 | 10/2021 | Koch |
| 11,173,401 | B1 | 11/2021 | Linden |
| 11,173,402 | B1 | 11/2021 | Koch |
| 11,173,404 | B1 | 11/2021 | Koch |
| 11,179,638 | B1 | 11/2021 | Linden |
| 11,179,640 | B1 | 11/2021 | Koch |
| 11,192,033 | B1 | 12/2021 | Koch |
| 11,192,036 | B1 | 12/2021 | Koch |
| 11,224,818 | B2 | 1/2022 | Cunningham |
| 11,229,848 | B1 | 1/2022 | Koch |
| 11,238,477 | B1 | 2/2022 | Koch |
| 11,288,759 | B1 | 3/2022 | Linden |
| 11,325,046 | B1 | 5/2022 | Koch |
| 11,328,358 | B2 | 5/2022 | Koch |
| 11,383,171 | B1 | 7/2022 | Stoyanov |
| 11,439,903 | B2 | 9/2022 | Hayashi |
| 11,511,201 | B1 | 11/2022 | Thacker |
| 11,833,435 | B2 | 12/2023 | Thacker |
| 2005/0137015 | A1 | 6/2005 | Rogers |
| 2006/0100006 | A1 | 5/2006 | Mitchell |
| 2006/0190392 | A1 | 8/2006 | Samid |
| 2007/0087831 | A1 | 4/2007 | Van Luchene |
| 2007/0099685 | A1 | 5/2007 | Van Luchene |
| 2007/0202951 | A1 | 8/2007 | Bogosian |
| 2009/0113040 | A1 | 4/2009 | Zalewski |
| 2009/0113554 | A1 | 4/2009 | Zalewski |
| 2009/0318221 | A1 | 12/2009 | Dhunjishaw |
| 2009/0325690 | A1 | 12/2009 | Zhou |
| 2010/0205430 | A1 | 8/2010 | Chiou |
| 2011/0183749 | A1 | 7/2011 | Allen |
| 2011/0312424 | A1 | 12/2011 | Burckart |
| 2013/0172086 | A1 | 7/2013 | Ikenaga |
| 2014/0011595 | A1 | 1/2014 | Muller |
| 2014/0058806 | A1 | 2/2014 | Guenette |
| 2014/0162781 | A1 | 6/2014 | Butler |
| 2015/0170112 | A1 | 6/2015 | Decastro |
| 2015/0224409 | A1 | 8/2015 | Hayashida |
| 2015/0347971 | A1 | 12/2015 | Brandon |
| 2015/0371295 | A1 | 12/2015 | Gill |
| 2015/0375103 | A1 | 12/2015 | George |
| 2016/0005270 | A1 | 1/2016 | Marr |
| 2016/0292680 | A1 | 10/2016 | Wilson, Jr. |
| 2016/0330034 | A1 | 11/2016 | Back |
| 2017/0095741 | A1 | 4/2017 | Perry |
| 2017/0236360 | A1 | 8/2017 | Dewaal |
| 2018/0178125 | A1 | 6/2018 | Perry |
| 2019/0028265 | A1* | 1/2019 | Bisti .................... G06F 21/606 |
| 2019/0158484 | A1 | 5/2019 | Grunewald |
| 2019/0282906 | A1 | 9/2019 | Yong |
| 2019/0299105 | A1 | 10/2019 | Knight |
| 2019/0354945 | A1 | 11/2019 | Mahajan |
| 2020/0090143 | A1 | 3/2020 | Iervolino |
| 2020/0160320 | A1 | 5/2020 | Williams |
| 2020/0202668 | A1 | 6/2020 | Cotta |
| 2020/0206620 | A1 | 7/2020 | Hayashi |
| 2020/0294133 | A1 | 9/2020 | Cella |
| 2020/0311721 | A1 | 10/2020 | Ow |
| 2020/0320623 | A1 | 10/2020 | Mcgrath |
| 2021/0052981 | A1 | 2/2021 | Yi |
| 2021/0106920 | A1 | 4/2021 | Lim |
| 2022/0072437 | A1 | 3/2022 | Koch |
| 2022/0198562 | A1 | 6/2022 | Cella |
| 2022/0230261 | A1 | 7/2022 | Linden |
| 2022/0266149 | A1 | 8/2022 | Linden |
| 2022/0266151 | A1 | 8/2022 | Koch |
| 2022/0280874 | A1 | 9/2022 | Koch |
| 2022/0314125 | A1 | 10/2022 | Koch |

OTHER PUBLICATIONS

Wood, Mike, "How to Leave Feedback on Ebay"—(https://www.youtube.com/watch?v=EIYiuTuAixA),May 25, 2017 (Year. 2017).
Wood, Mike, "How to Leave Feedback on Ebay",—(https://www.youtube.com/watch?v=EIY1uTuAixA), May 25, 2017 (Year: 2017).

* cited by examiner

SYSTEMS AND METHODS FOR FRACTIONAL OWNERSHIP OF USER-GENERATED CONTENT WITHIN AN ONLINE GAMING PLATFORM

FIELD OF THE DISCLOSURE

The present disclosure relates to systems and methods for fractional ownership of user-generated content within a gaming platform, and, in particular, for dispersing gains derived from such ownership among multiple users of the gaming platform.

BACKGROUND

Online gaming platforms are known. Collaboration among different users in a game is known. Exchanging digital in-game assets among the users of gaming platforms is known.

SUMMARY

One aspect of the present disclosure relates to a system configured to disperse gains derived from ownership of user-generated content among users of an online gaming platform who own the user-generated content. The online gaming platform may be configured to host one or more games, and may include one or more processors configured by machine-readable instructions. The one or more processors may be configured to execute, within an online gaming platform, an instance of a game to facilitate presentation of the game to the users, and implement in-game actions in the instance of the game in response to action requests for the in-game actions by the users. The presentation of the game may be based on views of the game that are determined during execution of the game. The users may include a first user and a second user that interact with the online gaming platform. The one or more processors may be configured to facilitate assignment of ownership of a first item of user-generated content to a group of contributing users. The first item of user-generated content may be configured to be used within the online gaming platform. The group of contributing users may include the first user and the second user. The one or more processors may be configured to record the ownership of the first item of user-generated content by the group of contributing users such that a first fraction of the first item of user-generated content is owned by the first user and a second fraction of the first item of user-generated content is owned by the second user. The one or more processors may be configured to determine a first quantity of gains that have been gained within the online gaming platform through use in the game, by at least some of the users, of the first item of user-generated content. The one or more processors may be configured to disperse at least a portion of the first quantity of gains to individual ones of the group of contributing users.

Another aspect of the present disclosure relates to a method for dispersing gains derived from ownership of user-generated content among users of an online gaming platform who own the user-generated content. The method may include executing, within an online gaming platform, an instance of a game to facilitate presentation of the game to the users, and implementing in-game actions in the instance of the game in response to action requests for the in-game actions by the users. The presentation of the game may be based on views of the game that are determined during execution of the game. The users may include a first user and a second user that interact with the online gaming platform. The method ay include facilitating assignment of ownership of a first item of user-generated content to a group of contributing users. The first item of user-generated content may be configured to be used within the online gaming platform. The group of contributing users may include the first user and the second user. The method may include recording the ownership of the first item of user-generated content by the group of contributing users such that a first fraction of the first item of user-generated content is owned by the first user and a second fraction of the first item of user-generated content is owned by the second user. The method may include determining a first quantity of gains that have been gained within the online gaming platform through use in the game, by at least some of the users, of the first item of user-generated content. The method may include dispersing at least a portion of the first quantity of gains to individual ones of the group of contributing users.

As used herein, any association (or relation, or reflection, or indication, or correspondency) involving servers, processors, client computing platforms, assets, rights, affiliations, members, benefits, ownership, instructions, operations, distributions, invitations, acceptances, inclusions, requests, verifications, presentations, sales, transfers, notifications, blockchains, approvals, denials, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
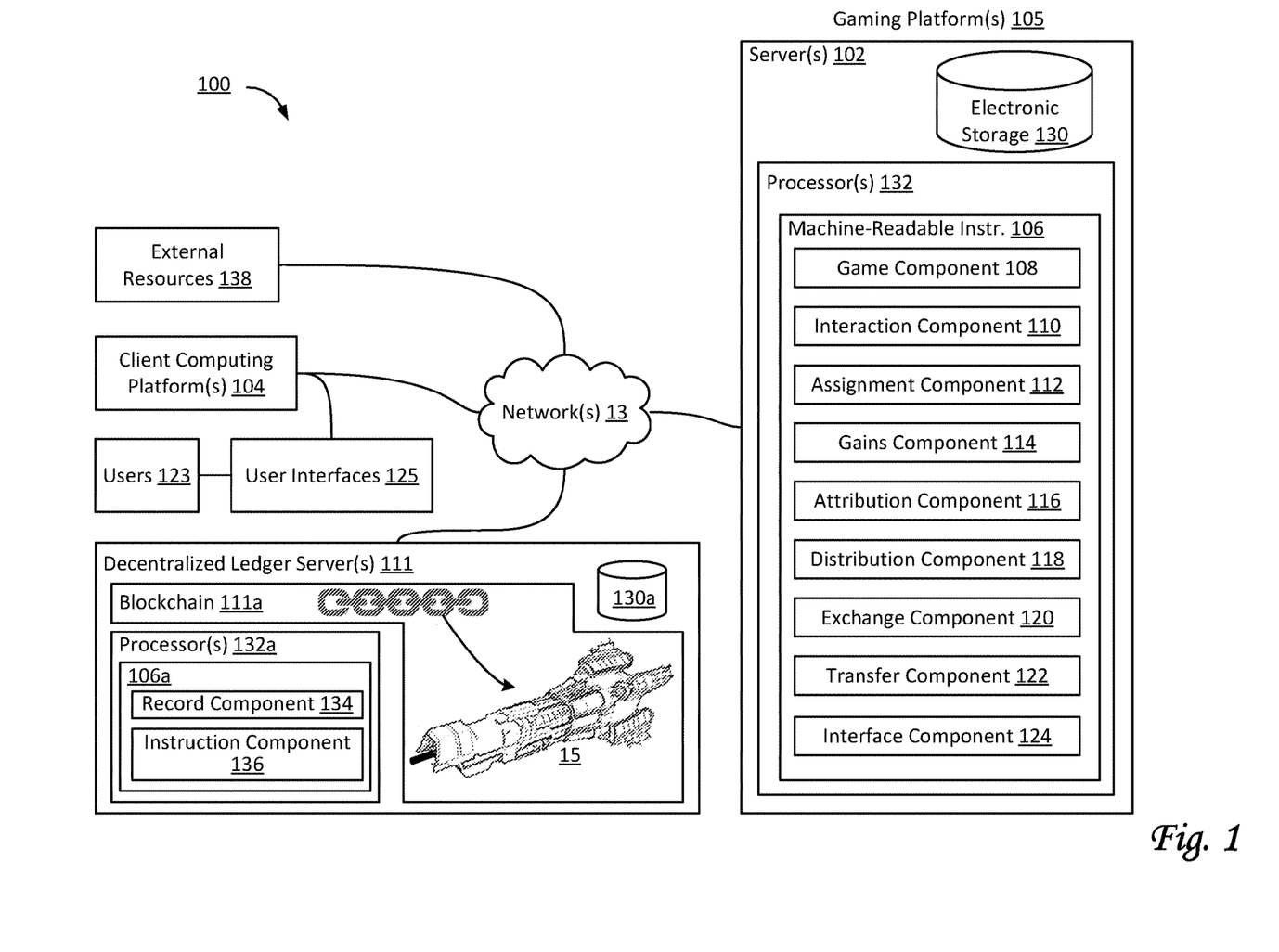
FIG. 1 illustrates a system configured for dispersing gains derived from ownership of user-generated content among users of a gaming platform who own the user-generated content, in accordance with one or more implementations.

FIG. 1 illustrates a system 100 configured for dispersing gains derived from ownership of user-generated content among users of one or more gaming platforms 105 (e.g., an online gaming platform), in accordance with one or more implementations. In some implementations, system 100 may include one or more of electronic storage 130, one or more servers 102, one or more client computing platforms 104, one or more gaming platforms 105, one or more decentralized ledger servers 111, one or more user interfaces 125, one or more external resources 138, and/or other components.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users 123 may access system 100 via client computing platform(s) 104. Users 123 (also referred to as players) may include one or more of a first user, a second user, a third user, a fourth user, and/or other users.

In some implementations, system 100 and/or servers 102 may be configured to communicate with one or more of (online) gaming platform(s) 105, users 123, decentralized ledger server(s) 111, and/or other components. As used herein, gaming platform 105 may refer to either an individual game, a type of gaming console and its ecosystem, and/or both. Gaming platform 105 may be operated, hosted, and/or owned by a stakeholder of gaming platform 105. Users 123 may include players who play on gaming platform 105. In some implementations, gaming platform 105 may include an online store that sells and/or otherwise transfers (in-game) virtual items that may be used within gaming platform 105. In some implementations, gaming platform 105 may support an exchange and/or marketplace for users 123 such that different users can gift, barter, sell, purchase, trade, and/or otherwise exchange (in-game) virtual items (including the types of assets and/or user-generated content described in this disclosure, which are also assets) that may be used within gaming platform 105 and/or may be useful within gaming platform 105. In some implementations, users can sell, purchase, trade, and/or otherwise exchange (in-game) virtual items through (external) online sales platforms, including but not limited to eBay™.

In some implementations, system 100 may include or use a (distributed) blockchain 111a that may be maintained by a distributed computing platform (not shown in FIG. 1) and/or one or more decentralized ledger servers 111. In some implementations, the distributed computing platform may be implemented by a set of computing platforms and/or servers (which may include one or more decentralized ledger servers 111). The distributed computing platform may support a virtual machine (not shown in FIG. 1). The distributed computing platform and/or the virtual machine may form a runtime environment for smart contracts and/or other executable code. In some implementations, the distributed computing platform may include electronic storage configured to store part or all of blockchain(s) 111a. The smart contracts may be stored on blockchain(s) 111a. In some implementations, the distributed computing platform may be the EOSIO platform. In some implementations, the distributed computing platform may be Ethereum. In some implementations, the distributed computing platform may be similar to Ethereum.

Blockchain 111a may act as a (decentralized) database that stores a registry and/or ledger of assets and transactions across one or more networks. In some implementations, a ledger may be implemented as a database. For example, a blockchain is a type of ledger, as well as a type of decentralized database that stores a registry of assets and transactions. Assets may include items of user-generated content and/or other virtual items that are usable within gaming platform 105. A given asset may be owned by a particular user. Some individual assets may be owned by a group of users. An asset may include anything of material value or usefulness that is owned by or on behalf of one or more users or companies or affiliations. In some implementations, a right pertaining to an object (e.g., a benefit) may be an asset, the object being a physical or a virtual item. Multiple rights may form a set of rights or a bundle of rights that may be transferred and/or otherwise acted on or operated on together. For example, rights may include one or more of a right to use, a right to sell, a right to destroy, a right to particular gains (as described elsewhere in this disclosure), and/or other rights. In some implementations, a right to a benefit may be referred to as a beneficiary right. In some implementations, a right to the distribution of a benefit may be referred to as a beneficiary right or a distribution right.

In some implementations, tokens may be a type of asset. In some implementations, tokens may include one or more of security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of blockchain 111a.

Blockchain(s) 111a may record and/or register ownership of assets. Alternatively, and/or simultaneously, blockchain(s) 111a may register transactions that modify ownership of assets. A smart contract may be a type of asset. In some implementations, once a smart contract has been added to a blockchain, the smart contract may be referred to as published, posted, registered, and/or recorded. Elements of blockchain(s) 111a may be grouped together in units that are referred to as blocks. For example, an individual block may include one or more assets, one or more transactions, and/or other information. For example, an individual block may be linked to one or more other individual blocks. Individual blocks may be linked or chained together to form a structure of blocks and/or a hierarchy of blocks, such as, e.g., a chain of blocks.

In some implementations, blockchain(s) 111a may be publicly accessible and append-only. In some implementations, existing blocks of a distributed blockchain can substantially not be altered or deleted, unless multiple copies of the distributed blockchain are altered. This is unlikely to happen provided that multiple copies of the distributed blockchain are stored on different computing platforms, e.g., in different geographical locations. The distributed blockchain may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or assets may be digitally signed in a manner that proves integrity and/or prevents tampering, e.g., by providing authentication.

Server(s) 102 may be configured by machine-readable instructions 106. Machine-readable instructions 106 may include one or more instruction components. The instruction components may include computer program components. The instruction components may include one or more of a game component 108, an interaction component 110, an assignment component 112, a gains component 114, an attribution component 116, a distribution component 118, an exchange component 120, a transfer component 122, an interface component 124, a record component 134, an instruction component 136, and/or other instruction components. Machine-readable instructions 106a may be similar to machine-readable instructions 106, though included in decentralized ledger servers 111.

Game component 108 may be configured to execute instances of games (e.g., of an online game within gaming platform 105) to facilitate presentation of the game(s) to users 123. In some implementations, game component 108 may be configured to implement in-game actions in an instance of a game, e.g., in response to action requests for the in-game actions by users 123. A game may be provided via a virtual space, and may include a plurality of resource types and/or maps. An instance of the virtual space may be executed by one or more computer components to determine views of the virtual space. In some implementations, the view may be communicated (e.g., by streaming, via object/position data, and/or other information) from server(s) 102 and/or other sources to client computing platforms 104 for presentation to users 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by a user.

The instance of the virtual space may include a simulated space that is accessible by users 123 by clients (e.g., client computing platforms 104) that present the views of the virtual space to a user. The simulated space may have a topography, express ongoing real-time interaction by one or more users, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the virtual space, users 123 may control characters, objects, simulated physical phenomena, and/or other elements within the virtual space to interact with the virtual space and/or each other. The user characters may include avatars. As used herein, the term "user character" may refer to an object or group of objects present in the virtual space, that correspond(s) to an individual user. A particular user character may be controlled by the particular user with which it is associated. Such user characters may be referred to as user-controlled characters. User-controlled element(s) may move through and interact with the virtual space (e.g., non-user characters in the virtual space, other objects in the virtual space, etc.). For example, a user-controlled character may be capable of locomotion within the topography of a simulated space (e.g., included in the virtual space of an instance of the game). User-controlled elements controlled by and/or associated with a given user may be created and/or customized by the given user. Individual users may have an "inventory" of virtual goods and currency (e.g., resources of the plurality of resource types) that the individual user can use (e.g., by manipulation of a user character and/or other user-controlled elements) and/or other items, to perform in-game actions within the virtual space.

Interaction component 110 may be configured to enable, facilitate, and/or implement in-game actions by users 123 in instances of games. In some implementations, interaction component 110 may be configured to operate in response to instructions and/or action requests by users 123. For example, multiple users may interact within gaming platform 105 to build, create, and/or otherwise generate content (i.e., user-generated content). In particular, an individual item of user-generated content may have been built, created, and/or otherwise generated by a group of users, e.g., operating collaboratively. In other words, this group of users has contributed to the building, creation, and/or generation of the individual item of user-generated content. For example, contributions may include in-game actions by individual ones of these users. Such a group of users may be referred to as a group of creating users, and/or a group of contributing users. For example, some users may have contributed one or more of their time, effort, resources, currency, talent, skill, leadership, and/or other items (whether tangible or not) that were used in generating the user-generated content. In some implementations, the members of a particular group of users may be known, determined, and/or selected prior to the generation of the user-generated content. By way of non-limiting example, a particular item of user-generated content may be a virtual warship 15 that can be used within gaming platform 105. In some implementations, virtual warship 15 may be used for at least one of races, battles, ambushes, raids, war, and/or other purposes within gaming platform 105. In some implementations, a group of users may have decided to create virtual warship 15 together, and this group may be the group of contributing users.

Assignment component 112 may be configured to facilitate assignments of ownership of assets (including but not limited to user-generated content and other assets that are usable within gaming platform 105). In some implementations, assignment component 112 may be configured to assign ownership of particular items of user-generated content to groups of users. For example, ownership of a first item of user-generated content may be assigned to a particular group of users. For example, the particular group of users may be the group of creating users. For example, the particular group of users may be the group of contributing users. In some implementations, ownership of a particular item of user-generated content may be assigned to a group of current owners.

In some implementations, the particular group of users may be a group of users that have been selected by a particular user. Assume, for example, a first user owns a particular item of user-generated content. This first user may select a set of users (which may include a second user), and assignment component 112 may be configured to assign ownership (or effectuate such assignment) of the particular item of user-generated content to the selected set of users (which could include the first user). For example, the first user may cause ownership of virtual warship 15 to be assigned to a set or group of users that include the first user and the second user (such that the first user owns a first fraction, and the second user owns a second fraction of the ownership of virtual warship 15).

In some implementations, assignment component 112 may be configured to facilitate a particular assignment of the ownership of a particular item of user-generated content such that the particular assignment includes some, most, or all of the users that have contributed or are contributing to the generation of the particular item of user-generated content. For example, system 100 may initiate an open build of a particular virtual warship (either open to any users who wish to contribute, or the first particular number of users who are contributing, or the first number of users having a particular affiliation or commonality and who wish to contribute, etc. etc.). Different users may contribute in different ways to building the particular virtual warship. Upon completion (or upon expiration of some predetermined time limit), assignment component 112 and/or another component of system 100 determines the set of contributing users and assigns ownership accordingly. In some implementations, different contributing users may own different percentages of a particular item of user-generated content. For example, the particular percentage may depend on user-specific time, effort, resources, currency, talent, skill, leadership, etc. that has been contributed. By way of non-limiting example, for virtual warship 15, the first user may own a 20% fraction, and the second and third user may each own a 40% fraction of the entire ownership.

Gains component 114 may be configured to determine quantities of gains that have been gained within gaming platform 105. For example, gains component 114 may determine a quantity of gain that has been gained through a particular activity within gaming platform 105. By way of non-limiting example, such activities may include at least one of a race, a competition, a challenge, a battle, an ambush, a raid, and a war conducted and/or performed within gaming platform 105. Alternatively, and/or simultaneously, gains component 114 may determine a quantity of gain that has been gained through the use of a particular virtual item within gaming platform 105. By way of non-limiting example, the particular virtual item may be virtual warship 15. Alternatively, and/or simultaneously, gains component 114 may determine a quantity of gain that has been gained through the use of one or more particular items of user-generated content within gaming platform 105. By way of non-limiting example, such user-generated content may include a fleet of virtual warships. In some implementations, determined quantities of gains may be limited to and/or specific to particular periods, durations, and/or amounts of time. In some implementations, gains may include one or more of prizes, earnings, profit, revenue, winnings, loot, plunder, booty, spoils of war, and/or other types of gains. In some implementations, gains may include both legitimate and illegitimate gains. For example, gains may have been obtained in a raid using virtual warship 15. In some implementations, gains may be earned by monetizing time spent by users 123 enjoying, exploring, and/or otherwise using a particular item or area of user-generated content (such as, e.g., a mall, a town, a snow-park, etc. etc.). In some implementations, such time may be monetized through advertising, through users paying an entrance fee or usage fee, and/or through other payment mechanisms that are specific to the particular item or area of user-generated content.

Attribution component 116 may be configured to determine portions of gains (as determined, e.g., by gains component 114) to be dispersed, disbursed, and/or otherwise provided to particular users. For example, attribution component 116 may determine portions of gains to be dispersed based on ownership of a particular item of user-generated content. For example, assume a particular raid resulted in gains of 100 gold coins. Furthermore, assume virtual warship 15 was used by a first group of users during the raid. Furthermore, assume virtual warship 15 is currently owned by a second group of users (also referred to as the group of current owners). Attribution component 116 may determine that 60% of the gains (here, 60 gold coins) will be divided among the first group of users. Additionally, attribution component 116 may determine that the remaining 40% of the gains (here, 40 gold coins) will be dispersed among the second group of users (either evenly or according to whatever scheme these users have agreed to). Furthermore, assume the second group of users includes the first, second, and third user. Attribution component 116 may determine that these 40 gold coins will be dispersed among the first, second, and third user in 20%, 40%, and 40% sub-portions (in accordance with the fractions of their ownership), respectively, such that the first user is provided with 20% of the 40 gold coins (here, 8 gold coins), and the second and third user are each provided with 40% of the 40 gold coins (here, 16 gold coins each). Of course, any of these users may additionally be part of the first group of users who will divide the 60% of the gains.

Distribution component 118 may be configured to disperse, disburse, and/or otherwise provide gains (or portions of gains, or sub-portions of gains) to users 123. Gains dispersed by distribution component 118 may be based on one or more determinations by gains component 114, attribution component 116, and/or other components of system 100. In some implementations, game component 108 and/or gaming platform 105 may manage user-specific user accounts for users 123. In some implementations, user-specific user accounts may include user-specific user inventories. In some implementations, distribution component 118 may be configured to provide (portions of) gains to user-specific user inventories.

Exchange component 120 may be configured to facilitate exchanges and/or transfers of ownership of assets within gaming platform 105. In some implementations, exchange component 120 may facilitate exchanges and/or transfers of ownership of items of user-generated content. In some implementations, exchange component 120 may facilitate exchanges and/or transfers of fractions of ownership of a particular item of user-generated content. For example, a first user may exchange a 20% fractional ownership of virtual warship 15 to a fourth user. As used herein, exchanges may refer to individual players auctioning, selling, purchasing, trading, bartering, gifting and/or otherwise exchanging (fractions of) digital assets (directly) with other individual players. In some implementations, a particular exchange may be involuntary, e.g., due to theft. Subsequently, a (new and different) dispersement by distribution component 118 to the set of current owners of virtual warship 15 would go to the fourth user instead of the first user (as well as other users that are current owners).

Transfer component 122 may be configured to generate sets of instructions for decentralized ledger server 111 and/or blockchain 111*a*. In some implementations, transfer component 122 may be configured to transfer generated sets of instructions to decentralized ledger server 111 and/or blockchain 111*a*. In some implementations, one or more of these instructions may instruct the formation of a smart contract and/or the recording of the smart contract on blockchain 111*a*. In some implementations, one or more of these instructions may instruct decentralized ledger server 111 to record and/or modify assets, transactions and/or rights on blockchain 111*a*. For example, transfer component 122 may generate a particular set of instructions that, upon execution by blockchain 111*a*, effectuate an assignment of ownership rights in a particular item of user-generated content to a particular group of users. Subsequently, transfer component 122 may generate another set of instructions that, upon execution by blockchain 111*a*, effectuate a modification of the assignment of ownership rights in the particular item of user-generated content.

Interface component 124 may be configured to facilitate interaction of users 123 with system 100. In some implementations, interface component may be configured to facilitate interaction by users 123 through user interfaces 125. For example, a particular user may be associated with a particular client computing platform 104, which may include a particular user interface 125. In some implementations, interface component 124 may be configured to facilitate assignments of ownership (of assets and/or items of user-generated content) through one or more user interfaces 125.

Figure 4:
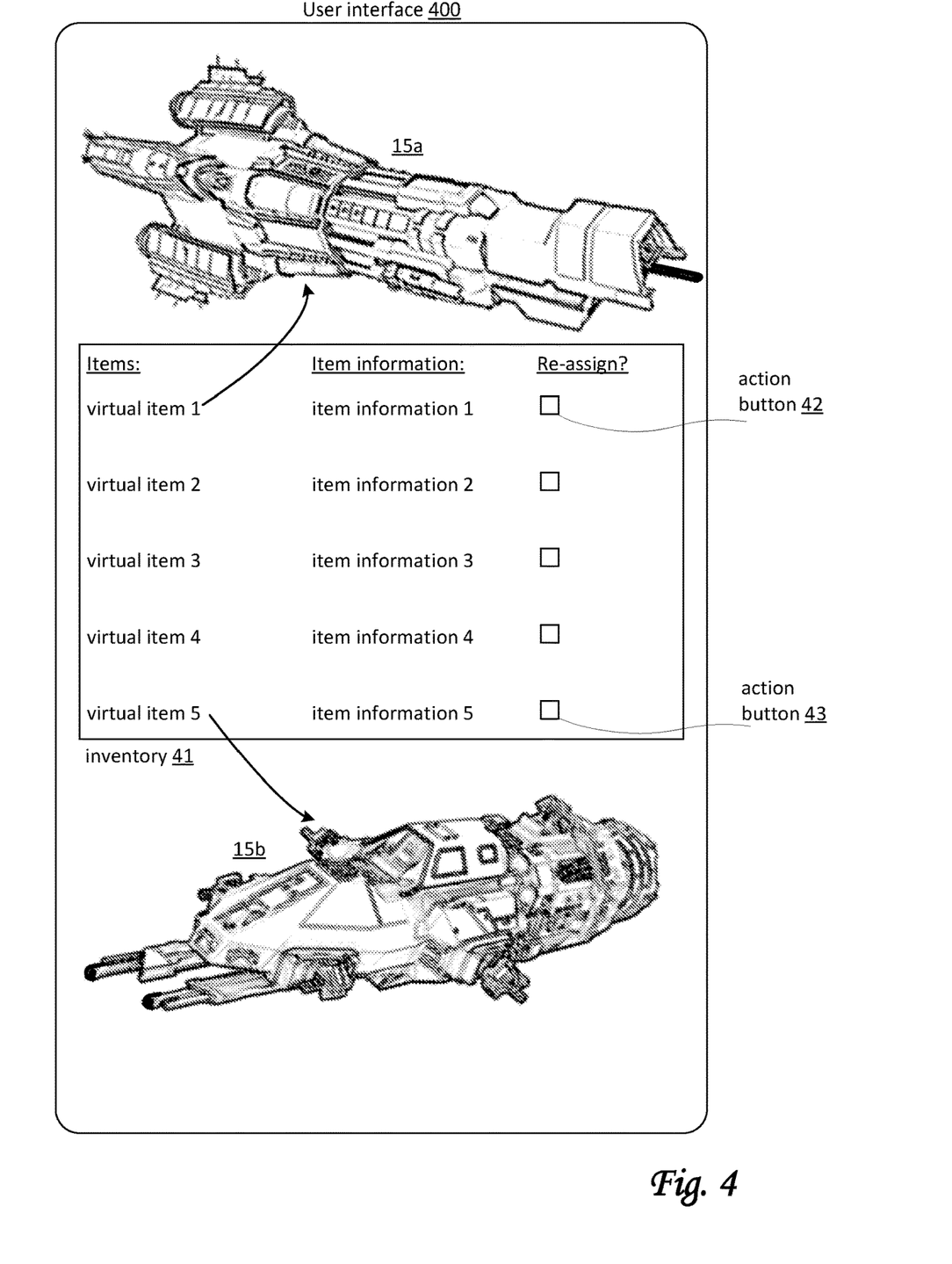
FIG. 4 illustrates a user interface, as may be used in a system as described, in accordance with one or more implementations.

By way of non-limiting example, FIG. 4 illustrates a user interface 400, depicting a user inventory 41, as may be used in system 100. As depicted, user inventory 41 may include a list of different virtual items and/or assets currently owned by a particular user, including virtual items 1-2-3-4-5. User interface 400 further depicts item information regarding these virtual items, as indicated by item information 1-2-3-4-5, which correspond to virtual items 1-2-3-4-5, respectively. For example, "virtual item 1" may be a virtual warship 15*a* (e.g., a battleship named "Thunderer") and "virtual item 5" may be a virtual warship 15*b* (e.g., a light frigate named "Legitimate Salvage"), as depicted in FIG. 4. User interface 400 may further include graphical user interface elements such as, by way of non-limiting example, action button 42 and action button 43. Upon engagement by a user, action button 42 may initiate a process to re-assign "virtual item 1", i.e., virtual warship 15*a*, to one or more users (perhaps different users than the particular user). Likewise, upon engagement by a user, action button 43 may initiate a different process to re-assign "virtual item 5", i.e., virtual warship 15*b*, to one or more users (perhaps different users than the particular user).

Referring to FIG. 1, instruction component 136 may be configured to receive (sets of) instructions to add, modify, and/or remove recorded rights in blockchain 111*a*. For example, instruction component 136 may receive one or more sets of instructions from transfer component 122, gaming platform 105, and/or other components of system 100. Instruction component 136 may provide received sets of instructions to record component 134 for execution. In some implementations, execution of individual ones of the instructions received to modify recorded rights may include invoking one or more function calls of an Application Programming Interface (API). For example, the API may be configured to provide interactive communication between blockchain 111*a* and other components of system 100. For example, in some implementations, API function calls may be implemented as function calls to smart contracts stored on blockchain 111*a*. In some implementations, instruction component 136 may be arranged, organized, and/or otherwise included in decentralized ledger server 111 and/or blockchain 111*a*.

Record component 134 may be configured to record (ownership) rights pertaining to digital assets, e.g., on blockchain 111*a*. In some implementations, record component 134 may record rights on electronic storage 130. In some implementations, record component 134 may record rights on blockchain 111*a*. The rights may include ownership rights, distribution rights, and/or other rights. For example, particular recorded rights may reflect ownership of a particular digital asset by a particular user or group of users. For example, the particular digital asset may be not fungible, and may represent a three-dimensional in-game user-controllable item or character that can interact with other virtual items within gaming platform 105. Recorded rights may be asset-specific. For example, distribution rights for a particular digital asset may designate rights to certain distributions of benefits upon an exchange involving the particular digital asset.

In some implementations, record component 134 may be configured to record rights in blockchain 111*a*. In some implementations, record component 134 may add, modify, and/or remove recorded rights. For example, in accordance with received instructions from instruction component 136, record component 134 may transfer ownership of a particular digital asset from a first owner to a second owner (e.g., from an original owner to a new owner) such that the recorded rights on blockchain 111*a* no longer reflect the ownership of the particular digital asset by the first user. In some implementations, in accordance with received instructions, record component 134 may transfer ownership of a particular digital asset temporarily, e.g., from a first owner to a temporary second owner. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, record component 134 may transfer ownership of a particular digital asset non-temporarily from a first owner to a second owner, e.g., when a particular exchange is not reversible or no longer reversible. In some implementations, record component 134 may be arranged, organized, and/or otherwise included in blockchain 111*a*.

In some implementations, record component 134 may be configured to obtain asset-specific rights (e.g., ownership rights, distribution rights, and/or other rights) for particular digital assets. In some implementations, record component 134 may be configured to access blockchain 111a to obtain the asset-specific rights (that are recorded on blockchain 111a, e.g., in one or more smart contracts).

Figure 3:
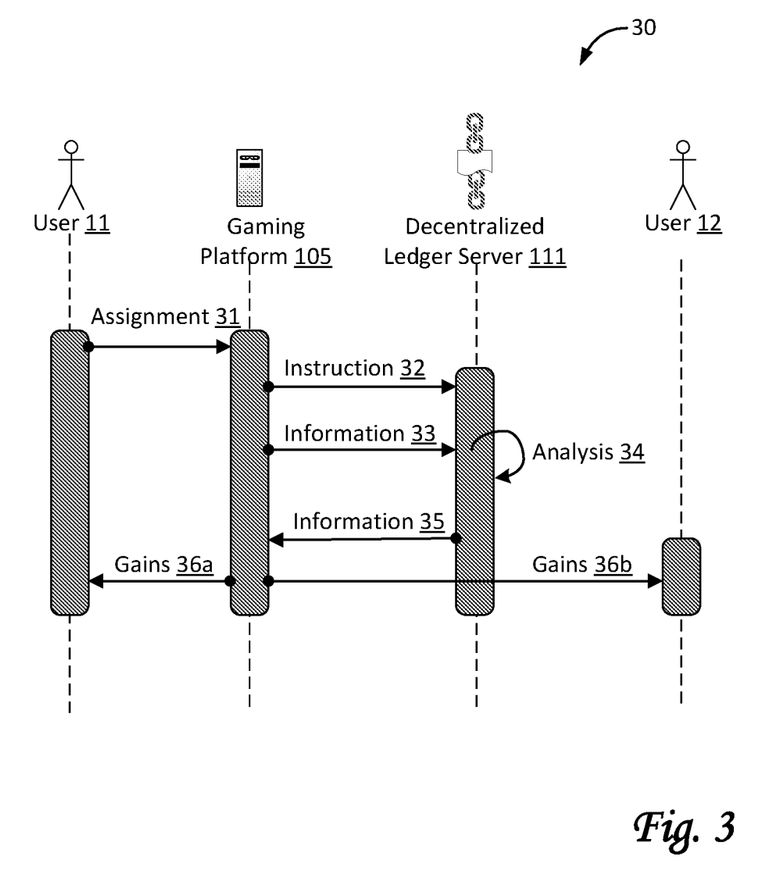
FIG. 3 illustrates a timing diagram for dispersing gains, as may be accomplished by a system as described, in accordance with one or more implementations.

By way of non-limiting example, FIG. 3 illustrates a timing diagram 30 of actions to disperse gains, as may be accomplished by system 100. A first action in timing diagram 30 represents an assignment 31 (of a particular item of user-generated content) from a user 11 to online gaming platform 105. Subsequent to assignment 31, an instruction 32 represents access and/or instructions to decentralized ledger server 111 and/or blockchain 111a (e.g., on a permissioned blockchain that is configured to record ownership and distribution rights of digital assets) to record the assignment. According to the assignment, both user 11 and user 12 are recorded as owners of the particular item of user-generated content. Subsequent to instruction 32, information 33 is transferred from gaming platform 105 to decentralized ledger server 111. For example, the information may describe that a particular quantity of gains has been earned within gaming platform 105 and is to be dispersed to the current owners of the particular item of user-generated content. Analysis 34 takes place by decentralized ledger server 111 and/or blockchain 111a, to determine the current owners of the particular item of user-generated content (here, user 11 and user 12). Information 35 is transferred from decentralized ledger server 111 to gaming platform 105, representing the results of analysis 34. Finally, gains 36a are dispersed to user 11 and gains 36b are dispersed to user 12, in accordance with the results of analysis 34.

Figure 5A:
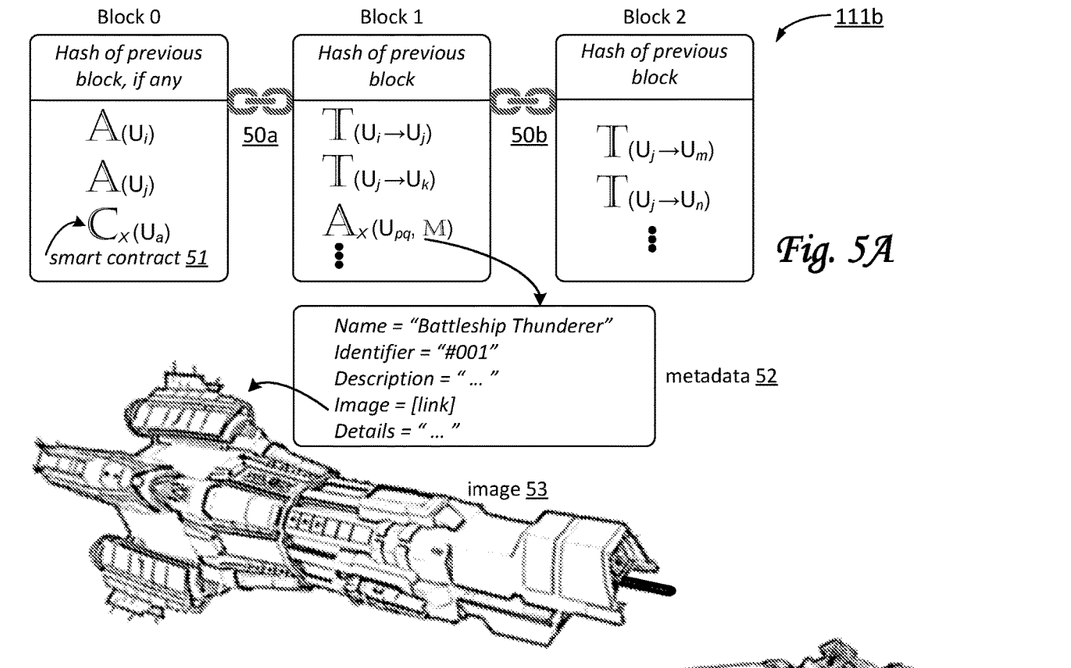
FIGS. 5A-5B illustrate exemplary blockchains as may be used by a system configured for dispersing gains derived from ownership of user-generated content among users of a gaming platform who own the user-generated content, in accordance with one or more implementations.

By way of non-limiting example, FIG. 5A illustrates a blockchain 111b that implements a blockchain including a block 0, a block 1, and a block 2. As time progresses, more blocks may be added to blockchain 111b. The blocks within blockchain 111b are ordered. As shown in block 0, two assets (indicated by a capital "A") are created and/or generated, and subsequently assigned to two users or players: a first asset is assigned to user i (Ui), a second asset is assigned to user j (Uj), and a third asset, a smart contract 51 indicated by a capital "C", is assigned to user "a" (Ua, e.g., an administrative user, or an autonomous agent tasked with dispersing gains by means of execution functions of smart contract 51). As used in the context of blockchains, assignments may be recordations of ownership (also referred to as recordings of ownership). These assets may be individually manifested, deployed, and/or instantiated on blockchain 111b. Block 1 is connected to block 0 (as indicated by a link 50a), for example, by including an address of block 1 in block 0, or vice versa. Likewise, block 1 is connected to block 2, as indicated by a link 50b.

In block 1, one asset (labeled Ax) is assigned to two users: user q (Uq) and user p (Up), for example by associating addresses of user q and user p to asset Ax. For example, the asset in block 1 may be an individual asset created by a group of users. Asset Ax may represent ownership rights of a particular item of user-generated content (e.g., a battleship named "Thunderer" as indicated by metadata 52 and depicted by image 53). Additionally, block 1 includes two transactions (indicated by a capital "T"): a first transaction from user i to user j, and a second transaction from user j to user k. Block 2 includes a first transaction from user j to user m, and a second transaction from user j to user n. In some implementations, based on the contents of the blocks, any user of blockchain 111b may determine the current assets of blockchain 111b, the balances of any user, and the current owners of any asset. In some implementations, the balance of a particular user may be verified prior to adding a transaction that reduces that particular user's balance. For example, an individual user may not be allowed to transfer assets the individual user does not own.

Figure 5B:
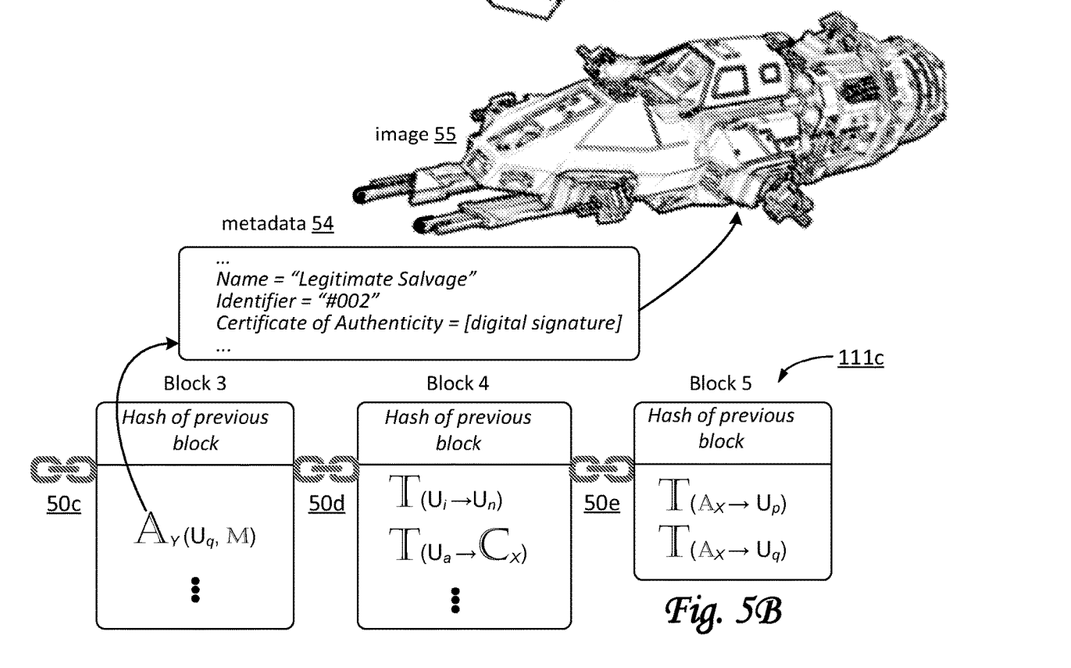

By way of non-limiting example, FIG. 5B illustrates a blockchain 111c that includes the same blocks as blockchain 111b of FIG. 5A, plus additional blocks (block 3, block 4, block 5) that have been appended to the blockchain. Block 3 may be connected to block 2 (as indicated by a link 50c), block 4 may be connected to block 3 (as indicated by a link 50d), and block 5 may be connected to block 4 (as indicated by a link 50e). In block 3, an asset (labeled Ay) is assigned to user q (Uq), for example by associating an address of user q to asset Ay. For example, the asset in block 3 may be an individual asset created by one or more users. Asset Ay may represent ownership rights of another item of user-generated content (e.g., a light frigate named "Legitimate Salvage" as indicated by metadata 54 and depicted by image 55).

In FIG. 5B, a function call to a function defined by smart contract 51 (e.g., to initiate a particular dispersement related to asset Ax) may be depicted and/or implemented as a transaction (e.g., the function may be invoked in exchange for consideration). In some implementations, smart contract 51 may have been posted to blockchain 111b by an administrative user. Block 4 includes a transaction (indicated by a capital "T") from user i to user n. For example, the transaction may represent a purchase of a first virtual item by user n. Additionally, block 4 includes a transaction from user "a" to the same smart contract as depicted in block 0. For example, the transaction may represent user "a" initiating a particular dispersement and/or distribution of gains to (the owners of) asset Ax. Block 5 includes a first transaction representing a transfer of gains from asset Ax to a first current owner of asset Ax, here this first owner is user p. Additionally, block 5 includes a second transaction representing a transfer of gains from asset Ax to a second current owner of asset Ax, here this second owner is user q.

Referring to FIG. 1, user interfaces 125 may be configured to facilitate interaction between users 123 and system 100 and/or between users 123 and client computing platforms 104. For example, user interfaces 125 may provide an interface through which users 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other user interface devices configured to receive and/or convey user input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between users.

In some implementations, server(s) 102, client computing platform(s) 104, and/or external resources 138 may be operatively linked via one or more electronic communication links. For example, such electronic communication links may be established, at least in part, via one or more networks 13, including but not limited to the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a smart watch, a gaming console, and/or other computing platforms.

External resources 138 may include sources of information outside of system 100, external entities participating with system 100, and/or other resources. For example, in some implementations, external resources 138 may include an online sales platform through which assets may be purchased and sold between different users. In some implementations, some or all of the functionality attributed herein to external resources 138 may be provided by resources included in system 100.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein. Electronic storage 130a may be similar to electronic storage 130, though included in decentralized ledger servers 111.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 134, and/or 136, and/or other components. Processor(s) 132 may be configured to execute components 108, 110, 112, 114, 116, 118, 120, 122, 124, 134, and/or 136, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 134, and/or 136 are illustrated in FIG. 1 as being implemented within a single processing unit, in implementations in which processor(s) 132 includes multiple processing units, one or more of components 108, 110, 112, 114, 116, 118, 120, 122, 124, 134, and/or 136 may be implemented remotely from the other components. The description of the functionality provided by the different components 108, 110, 112, 114, 116, 118, 120, 122, 124, 134, and/or 136 described below is for illustrative purposes, and is not intended to be limiting, as any of components 108, 110, 112, 114, 116, 118, 120, 122, 124, 134, and/or 136 may provide more or less functionality than is described. For example, one or more of components 108, 110, 112, 114, 116, 118, 120, 122, 124, 134, and/or 136 may be eliminated, and some or all of its functionality may be provided by other ones of components 108, 110, 112, 114, 116, 118, 120, 122, 124, 134, and/or 136. As another example, processor(s) 132 may be configured to execute one or more additional components that may perform some or all of the functionality attributed below to one of components 108, 110, 112, 114, 116, 118, 120, 122, 124, 134, and/or 136. Processors 132a may be similar to processors 132, though included in decentralized ledger servers 111.

Figure 2:
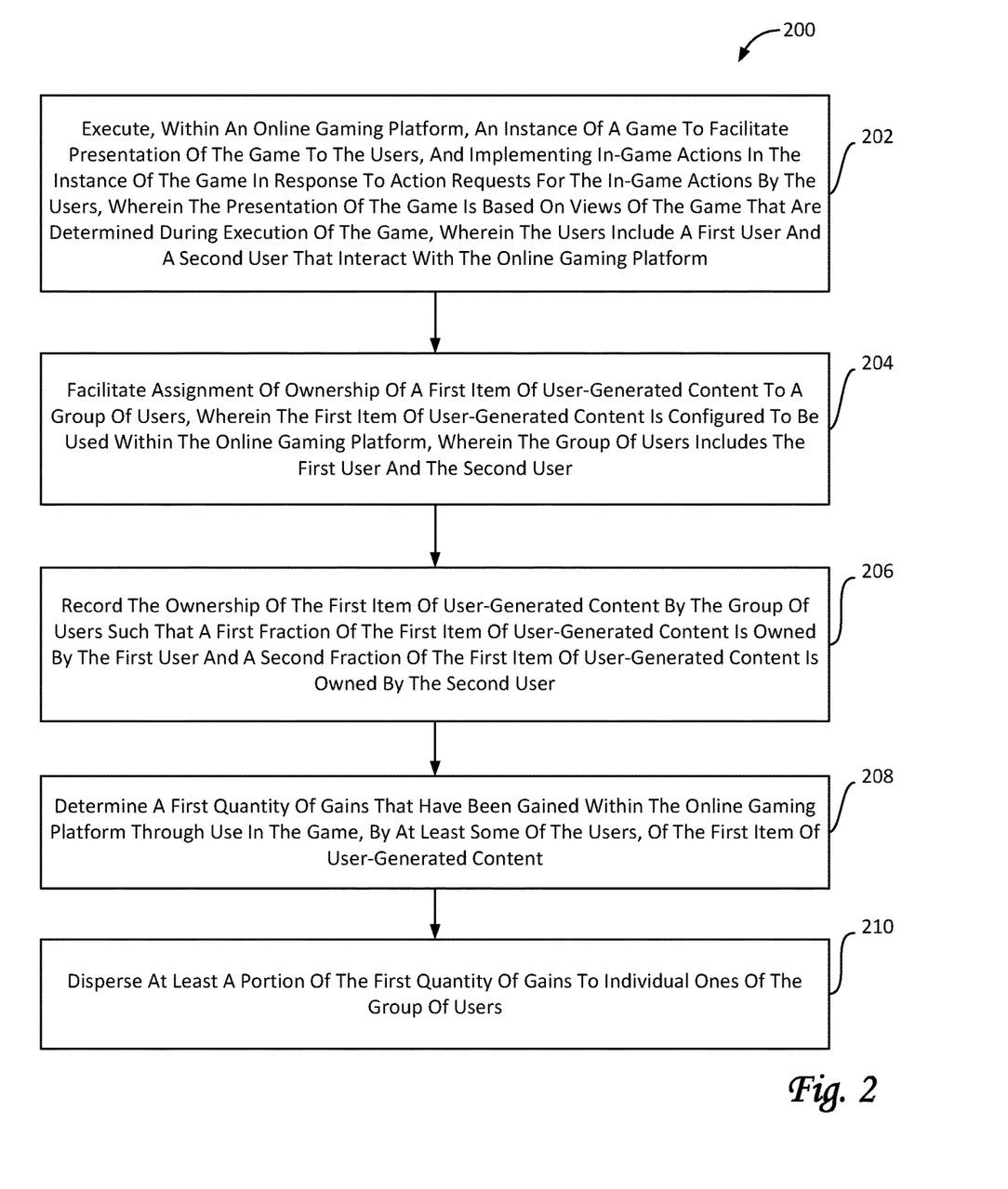
FIG. 2 illustrates a method for dispersing gains derived from ownership of user-generated content among users of a gaming platform who own the user-generated content, in accordance with one or more implementations.

FIG. 2 illustrates a method 200 for dispersing gains derived from ownership of user-generated content among users of an online gaming platform who own the user-generated content, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed within an online gaming platform to facilitate presentation of the game to the users, and in-game actions are implemented in the instance of the game in response to action requests for the in-game actions by the users. The presentation of the game is based on views of the game that are determined during execution of the game. The users include a first user and a second user that interact with the online gaming platform. In some embodiments, operation 202 is performed by a game component the same as or similar to game component 108 (shown in FIG. 1 and described herein).

At an operation 204, assignment of ownership of a first item of user-generated content to a group of users is facilitated. The first item of user-generated content is configured to be used within the online gaming platform. The group of users includes the first user and the second user. In some embodiments, operation 204 is performed by an assignment component the same as or similar to assignment component 112 (shown in FIG. 1 and described herein).

At an operation 206, ownership of the first item of user-generated content by the group of users is recorded such that a first fraction of the first item of user-generated content is owned by the first user and a second fraction of the first item of user-generated content is owned by the second user. In some embodiments, operation 206 is performed by a record component the same as or similar to record component 134 (shown in FIG. 1 and described herein).

At an operation 208, a first quantity of gains is determined that have been gained within the online gaming platform through use in the game, by at least some of the users, of the first item of user-generated content. In some embodiments, operation 208 is performed by a gains component the same as or similar to gains component 114 (shown in FIG. 1 and described herein).

At an operation 210, at least a portion of the first quantity of gains is dispersed to individual ones of the group of users. In particular, to the group of users who currently own the first item of user-generated content. In some embodiments, operation 210 is performed by a distribution component the same as or similar to distribution component 118 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to disperse gains derived from ownership of user-generated content among users of an online gaming platform, wherein the online gaming platform hosts a game, the system comprising:
the online gaming platform comprising one or more processors configured by machine-readable instructions to:
record, on a decentralized ledger implemented by a decentralized ledger server, ownership of a first item of user-generated content by a group of owning users including a first user and a second user such that a first fraction of the first item of user-generated content is owned by the first user and a second fraction of the first item of user-generated content is owned by the second user;
determine a first quantity of gains that have been gained from the users within the online gaming platform through use in the game of the first item of user-generated content by the users; and
automatically disperse, by the one or more processors, at least a first portion of the first quantity of gains to the first user and a second portion of the first quantity of gains to the second user, based on the first fraction and the second fraction of the ownership of the first item of user-generated content as recorded on the decentralized ledger.

2. The system of claim 1, wherein the one or more processors are further configured to:
execute, within the online gaming platform, an instance of the game, and implement in-game actions in the instance of the game in response to action requests for the in-game actions by the users.

3. The system of claim 1, wherein the one or more processors are further configured to:
automatically determine the first portion and the second portion of the first quantity of gains to be dispersed, wherein determination of the first portion and the second portion are based on the first fraction and the second fraction of the ownership of the first item of user-generated content as recorded.

4. The system of claim 1, wherein the one or more processors are further configured to:
facilitate creation of the first item of user-generated content by the group of owning users, wherein individual ones of the group of owning users have contributed at least one of (i) effort and/or (ii) resources to the creation of the first item of user-generated content.

5. The system of claim 1, wherein execution of the instance of the game is performed such that the first user and the second user are enabled to interact with each other within the online gaming platform.

6. The system of claim 4, wherein the one or more processors are further configured to:
automatically determine individual sub-portions of the first quantity of gains to be dispersed to individual ones of the group of owning users, wherein determination of the individual sub-portions of the first quantity of gains is based on an agreement among the group of owning users that has been accepted prior to the first quantity of gains being gained.

7. The system of claim 1, wherein the first item of user-generated content is configured to be used for at least one of a race, a battle, an ambush, a raid, and/or a war conducted and/or performed within the online gaming platform.

8. The system of claim 1, wherein the use of the first item of user-generated content includes at least some of the users spending time within the game being engaged with the first item of user-generated content, and wherein the first quantity of gains is obtained through monetization of the spending of time.

9. The system of claim 1, wherein the one or more processors are further configured to:
facilitate a transfer of the first fraction of the ownership of the first item of user-generated content from the first user to a third user;
record the ownership of the first fraction of the first item of user-generated content by the third user;

automatically determine a second quantity of gains that have been gained within the online gaming platform through use in the game of the first item of user-generated content; and disperse at least a portion of the second quantity of gains to the third user, based on the ownership of the first fraction of the first item of user-generated content by the third user as recorded.

10. The system of claim 1, wherein assignment of the ownership is facilitated through a user interface.

11. A method for dispersing gains derived from ownership of user-generated content among users of an online gaming platform that hosts a game, wherein the online gaming platform includes one or more processors, the method comprising:

recording, on a decentralized ledger implemented by a decentralized ledger server, ownership of a first item of user-generated content by a group of owning users including a first user and a second user such that a first fraction of the first item of user-generated content is owned by the first user and a second fraction of the first item of user-generated content is owned by the second user;

determining a first quantity of gains that have been gained from the users within the online gaming platform through use in the game of the first item of user-generated content by the users; and automatically dispersing, by the one or more processors, at least a first portion of the first quantity of gains to the first user and a second portion of the first quantity of gains to the second user, based on the first fraction and the second fraction of the ownership of the first item of user-generated content as recorded on the decentralized ledger.

12. The method of claim 11, further comprising:
executing, within the online gaming platform, an instance of the game, and implement in-game actions in the instance of the game in response to action requests for the in-game actions by the users.

13. The method of claim 11, further comprising:
automatically determining the first portion and the second portion of the first quantity of gains to be dispersed, wherein determination of the first portion and the second portion are based on the first fraction and the second fraction of the ownership of the first item of user-generated content as recorded.

14. The method of claim 11, further comprising:
facilitating creation of the first item of user-generated content by the group of owning users, wherein individual ones of the group of owning users have contributed at least one of (i) effort and/or (ii) resources to the creation of the first item of user-generated content.

15. The method of claim 11, wherein executing the instance of the game is performed such that the first user and the second user are enabled to interact with each other within the online gaming platform.

16. The method of claim 14, further comprising:
automatically determining individual sub-portions of the first quantity of gains to be dispersed to individual ones of the group of owning users, wherein determining the individual sub-portions of the first quantity of gains is based on an agreement among the group of owning users that has been accepted prior to the first quantity of gains being gained.

17. The method of claim 11, wherein the first item of user-generated content is configured to be used for at least one of a race, a battle, an ambush, a raid, and/or a war conducted and/or performed within the online gaming platform.

18. The method of claim 11, wherein the use of the first item of user-generated content includes at least some of the users spending time within the game being engaged with the first item of user-generated content, and wherein the first quantity of gains is obtained through monetization of the spending of time.

19. The method of claim 11, further comprising:
facilitating a transfer of the first fraction of the ownership of the first item of user-generated content from the first user to a third user;

recording the ownership of the first fraction of the first item of user-generated content by the third user;

automatically determining a second quantity of gains that have been gained within the online gaming platform through use in the game of the first item of user-generated content; and dispersing at least a portion of the second quantity of gains to the third user, based on the ownership of the first fraction of the first item of user-generated content by the third user as recorded.

20. The method of claim 11, wherein facilitating assignment of the ownership is accomplished through a user interface.

* * * * *